United States Patent [19]

Wessel

[11] Patent Number: 4,967,473
[45] Date of Patent: Nov. 6, 1990

[54] METHOD OF FORMING A BOW BEAM FOR A TRUCK TRAILER

[76] Inventor: Kenneth C. Wessel, 21280 Avalon Dr., Rocky River, Ohio 44116

[21] Appl. No.: 443,003

[22] Filed: Nov. 29, 1989

Related U.S. Application Data

[63] Continuation of Ser. No. 230,918, Aug. 11, 1988, abandoned.

[51] Int. Cl.$^5$ .............................................. B23P 17/00
[52] U.S. Cl. .................................. 29/897.2; 29/527.5; 29/897.34; 52/45; 72/256
[58] Field of Search ................. 72/256, 377; 29/527.5, 29/897.2, 897.34; 52/45

[56] References Cited

U.S. PATENT DOCUMENTS 3,164,898  1/1965  Kotrbaty ........................... 72/256 X Primary Examiner—Carl E. Hall
Assistant Examiner—Carl I. Arbes
Attorney, Agent, or Firm—Harlan E. Hummer

[57] ABSTRACT

A bow beam, as well as a method of making the beam for the roof of truck trailer, is described as being initially extruded in a U-shape with a flat web which is heavier than a pair of legs which extend from the web. The extruded beam is then placed in a press where the free ends of the legs are bent to form a bow in the topside of the beam in spaced relation from the flat bottom web. Thus, the strength of the beam is optimized with a minimal amount of material.

6 Claims, 1 Drawing Sheet

METHOD OF FORMING A BOW BEAM FOR A TRUCK TRAILER

This application is a continuation of application Ser. No. 07/230,918 filed Aug. 11, 1988, now abandoned.

BACKGROUND OF INVENTION

The invention relates to truck trailers, especially the structural beams that are used to form the roof of a truck trailer. Such beams must be strong, but lightweight, since weight is a critical factor in the transportation of goods over highways. For this reason, the sidewalls and roof of a truck trailer are normally built of aluminum, or some other lightweight material.

The invention is designed to maximize the strength of the roof beams while minimizing the material from which they are formed.

Briefly stated, the invention is in a method of extruding a U-shaped beam which has a flat web that is straight between opposing ends of the beam, and a pair legs which extend at least initially in parallel relation from the web which is thicker than the legs. The extruded beam is then placed in a press where the free ends of the legs are bent outwardly to form in the upper surface of the beam, a bow or crown which curves outwardly away from the straight web.

The combination extrusion and bending process produces a beam with optimum strength at minimal costs. This is very important when you consider the millions of beams that are used in the production of truck trailers.

DESCRIPTION OF DRAWING

The following description of the invention will be better understood by having reference to the accompanying drawing, wherein.

ENVIRONMENT OF INVENTION

Figure 1:
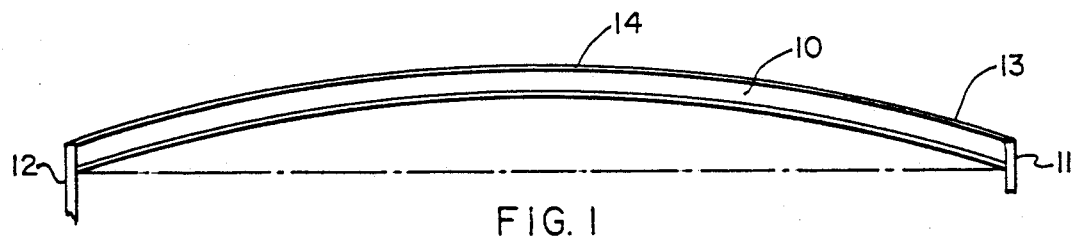
FIG. 1 is a side view of a bow beam of the prior art, in position, on the roof of a truck trailer.

With particular reference to FIG. 1, there is shown a bow beam 10 that is mounted between opposing sidewalls 11, 12 of a truck trailer body 13 and covered with a sheet 14 of aluminum. The bow beam 10 is formed of aluminum by rolling or extrusion, after which the beam is bent to give it a slight bow or crown. Such beams have a uniform cross-section of any suitable shape, e.g. a channel or I-beam configuration. It has been found that the overall width of the trailer top will vary as this type of bow beam flexes as the truck trailer bounces along the highway. This causes the aluminum cover 14 to eventually fatigue and crack, thereby needing replacement which is costly and time consuming.

Figure 2:
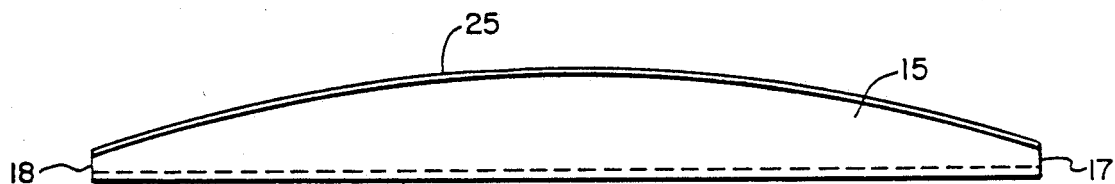
FIG. 2 is a side view of another bow beam of the prior art.
Figure 3:
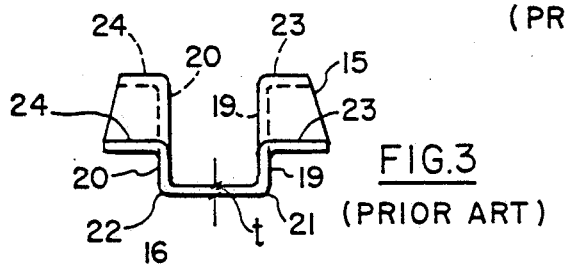
FIG. 3 is an end view of the bow beam of FIG. 2.

With reference to FIGS. 2 and 3, there is shown a different roof beam 15 which is U-shaped and has a flat web 16 which is straight between opposing ends 17, 18 of the beam 15. The web 16 is designed to be in a horizontal plane when, in place, on a truck trailer that is resting on a horizontal roadway. A pair of flat, upstanding legs 19, 20 extend upwardly at right angles from longitudinal marginal edges 21, 22 of the web 16 and terminate at a pair of curved flanges 23, 24 which, when taken in section, are parallel to the web 16, as seen in FIG. 3, The legs 19, 20 vary, in length, from a minimum at the ends 17, 18 to a maximum at the center of the beam 15. Conversely, the flanges 23, 24 vary, in width, from a maximum at the ends 17, 18 to a minimum at the center of the beam 15. This particular beam 15 is bent from a piece of sheet metal which has a uniform thickness t. Thus, the web 16, legs 19, 20 and flanges 23, 24 have the same thickness which is a waste of material, since the legs 19. 20 and especially the flanges 23, 24 could be thinner without impairing the structural integrity of the beam. This particular roof beam 15 will not vary in length during flexing, because only the top 25 of the beam 15 is curved.

THE INVENTION

Figure 4:
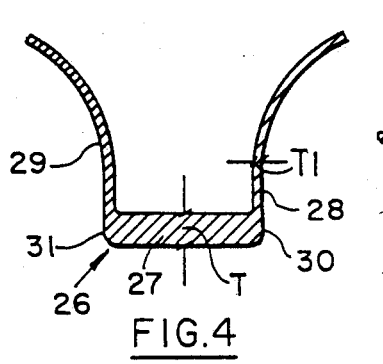
FIG. 4 is a cross-section of a bow beam which is extruded in accordance with the invention.
Figure 5:
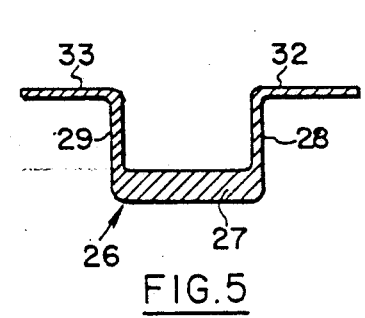
FIG. 5 is a cross-section of the bow beam of the invention at the ends of the beam, after the bending process.
Figure 6:
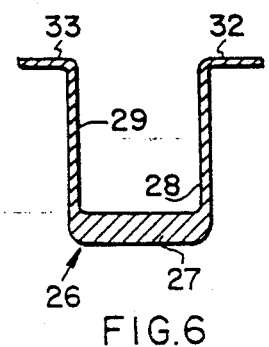
FIG. 6 is a cross-section of the bow beam of the invention at the center of the beam, after bending.

With reference to FIGS. 4-6, there is shown a roof beam 26 which is first extruded in the U-shape shown in FIG. 4. In its initial configuration, the beam 26 comprises a flat web 27 which, like the roof beam 15 of FIG. 2, is straight between the opposing ends (17, 18) of the beam 26. A pair of legs 28, 29 extend upwardly at right angles from the longitudinal marginal edges 30, 31 of the web 27 and then flare outwardly from each other to facilitate the downstream bending process to curve or bow the top (25) of the beam 26. The web 27 has a thickness T which is heavier than the thickness TI of the legs 28, 29 to optimize the load carrying capacity of the beam 26 with a minimum of material, unlike a roof beam that is formed from a sheet of metal which has a uniform thickness.

The extruded beam 26 is then placed in a press which is used to bend the outer free ends of the legs 28, 29 downwardly towards the web to form the outstretched curved flanges 32, 33 which are similar to the flanges 23, 24 of the bow beam 15 shown in FIGS. 2 and 3. The legs 28, 29 are also shorter at the ends and longer at the middle of the beam 26 in converse relation to the width of the flanges 32, 33 which are wider at the ends and narrower at the center of the beam 26, as seen in FIGS. 5 and 6.

The combination extrusion and bending process produces a bow beam which has the strength and advantages of a sheet-formed beam, but at a savings in material which adds up to a tremendous savings in material and money when the millions of beams used in the trucking industry are considered.

What is claimed is:

1. A method of forming a beam for the roof of a truck body or trailer, comprising:
   (a) extruding a beam member having a pair of opposing ends and a generally U-shaped cross-section which comprises, (i) a web having a predetermined thickness between a pair of parallel marginal edges, and (ii) a pair of legs which at least extend from the marginal edges of the web in the same parallel direction, the legs having the same thickness which is less than the thickness of the web, the legs having free ends in spaced relation from the web; and
   (b) subsequently bending the free ends of the legs outwardly away from each other to form a pair of flanges, each of which flanges varies in width, measured from an attached leg, from a maximum at opposing ends of the beam member to a minimum midway between the opposing ends of the beam member, the legs corresponding varying in length, measured between the web and flanges, from a minimum at opposing ends of the beam member to a maximum midway between the opposing ends of the beam member.

2. The method of claim 1, wherein the free ends of the legs are extruded to flare outwardly away from each other to facilitate the bending thereof.

3. The method of claim 2, wherein the legs are extruded with a uniform thickness.

4. The method of claim 3, which includes:

(c) mounting a plurality of such beams in parallel relation between a pair of sidewalls of a truck trailer such that the curved flanges of the beams are farther spaced from a floor of the trailer than the straight webs of the beams; and (d) covering the curved flanges with a sheet of material.

5. The method of claim 3, wherein the beams are formed of material of the group consisting of aluminum and steel.

6. The method of claim 1, wherein the free ends of the legs are bent such that the flanges are curved outwardly of the web.

* * * * *